US005176479A

United States Patent [19]

McCracken

[11] Patent Number: 5,176,479

[45] Date of Patent: Jan. 5, 1993

[54] BALL BEARING POCKETS IN A ROUTER DEPTH OF CUT ADJUSTMENT RING

[75] Inventor: Robert E. McCracken, Easley, S.C.

[73] Assignee: Ryobi Motor Products Corp., Easley, S.C.

[21] Appl. No.: 863,468

[22] Filed: Apr. 1, 1992

Related U.S. Application Data

[63] Continuation of Ser. No. 792,678, Nov. 15, 1991, abandoned.

[51] Int. Cl.[5] .................... B23C 1/20

[52] U.S. Cl. .................... 409/182; 144/134 D; 144/136 C; 409/204

[58] Field of Search .............. 409/181, 182, 204, 206, 409/218; 144/134 D, 136 C; 408/202, 241 S

[56] References Cited

U.S. PATENT DOCUMENTS

| | | | |
|---|---|---|---|
| 131,843 | 10/1872 | Brooks . | |
| 1,899,883 | 2/1933 | Sacrey . | |
| 1,929,116 | 10/1933 | Kirton . | |
| 2,613,704 | 10/1952 | Sacrey . | |
| 2,842,173 | 7/1958 | Turner et al. | 144/134 D |
| 2,867,251 | 1/1959 | Moretti et al. . | |
| 2,988,119 | 6/1961 | Godfrey et al. . | |
| 3,313,198 | 4/1967 | Walton . | |
| 3,363,510 | 1/1968 | Burrows et al. | 409/182 |
| 3,443,479 | 5/1969 | Hawley et al. | 409/182 |
| 3,466,973 | 9/1969 | Rees . | |
| 3,489,191 | 1/1970 | Blevins . | |
| 3,935,788 | 2/1976 | Gilmore . | |
| 4,051,880 | 10/1977 | Hestily . | |
| 4,108,225 | 8/1978 | Hestily | 409/182 |
| 4,239,428 | 12/1980 | Berzina . | |
| 4,316,685 | 2/1982 | George . | |
| 4,319,860 | 3/1982 | Beares . | |
| 4,469,235 | 9/1984 | Parker . | |
| 4,647,260 | 3/1987 | O'Hara et al. . | |
| 4,679,606 | 7/1987 | Bassett . | |
| 4,731,512 | 3/1988 | Barriac . | |
| 5,074,724 | 12/1991 | McCracken | 409/182 |
| 5,088,865 | 2/1992 | Beth et al. . | |

*Primary Examiner*—Daniel W. Howell
*Attorney, Agent, or Firm*—Brooks & Kushman

[57] ABSTRACT

A portable electric router having a depth of cut adjustment mechanism including an adjustment ring which engages a screw thread on the motor housing and rotationally engages the router base. Rotational engagement of the ring with the base is effected by providing an annular groove on the base and a projection on the ring engaging the groove. The projection is formed with a plurality of pockets each having an opening communicating with the groove. Within each of the pockets is a ball which extends through the opening to contact a wall of the groove and thereby act as a ball bearing.

5 Claims, 5 Drawing Sheets

BALL BEARING POCKETS IN A ROUTER DEPTH OF CUT ADJUSTMENT RING

This is a continuation of copending application Ser. No. 07/792,678 filed on Nov. 15, 1991, now abandoned.

BACKGROUND OF THE INVENTION

This invention relates to portable electric routing tools and, more particularly, to a depth of cut adjustment mechanism for such a tool.

In U.S. patent application Ser. No. 07/661,619, filed Feb. 28, 1991, now U.S. Pat. No. 5,074,724, and assigned to the assignee of the present invention, the contents of which are hereby incorporated by reference, there is disclosed a portable electric router having a depth of cut adjustment mechanism including an adjustment ring which engages a screw thread on the motor housing and rotationally engages the router base. The motor housing and base are prevented from having relative rotation therebetween. The rotational engagement of the router base by the adjustment ring is effected by providing the base with an external annular groove and providing the adjustment ring with a projection engaging the groove so that the adjustment ring is rotatable on the base about the longitudinal axis of the router. The adjustment ring is preferably formed as a unitary molded plastic member which comprises two hingedly joined substantially semi-cylindrical portions. When the router base is made of a material similar to the material of the adjustment ring, the adjustment ring rotates on the base in a relatively frictionless manner and is not subject to excessive wear. However, if the router base is formed of metal, frictional forces are generated between the projection of the adjustment ring and the walls of the annular groove of the base. These frictional forces detract from the free relative rotation of the adjustment ring. Further, the projection on the adjustment ring is subjected to excessive wear. Accordingly, it is an object of this invention to provide an arrangement in a router of the type described which allows for a relatively frictionless engagement between the adjustment ring and the router base when the router base is formed of metal and the adjustment ring is formed of plastic.

SUMMARY OF THE INVENTION

The foregoing, and additional, objects are attained in accordance with the principles of this invention in a router having an adjustment ring for setting the depth of cut of the router, the router having a base with an external annular groove and the adjustment ring having a projection engaging the groove so that the adjustment ring is rotatable on the base about the longitudinal axis of the router. As contemplated by this invention, a plurality of cavities, or pockets, are formed in the adjustment ring projection, each of the cavities having a first opening communicating with the groove and a second opening communicating with the exterior of the adjustment ring. There is further provided a plurality of balls, each of which is disposed within a respective one of the plurality of cavities. Each of the balls is smaller than the respective second opening and larger than the respective first opening of the cavity. Within each of the cavities between the first and second openings there is situated means for holding the respective ball within the cavity with a portion of the ball extending through the first opening for contact with a wall of the groove.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
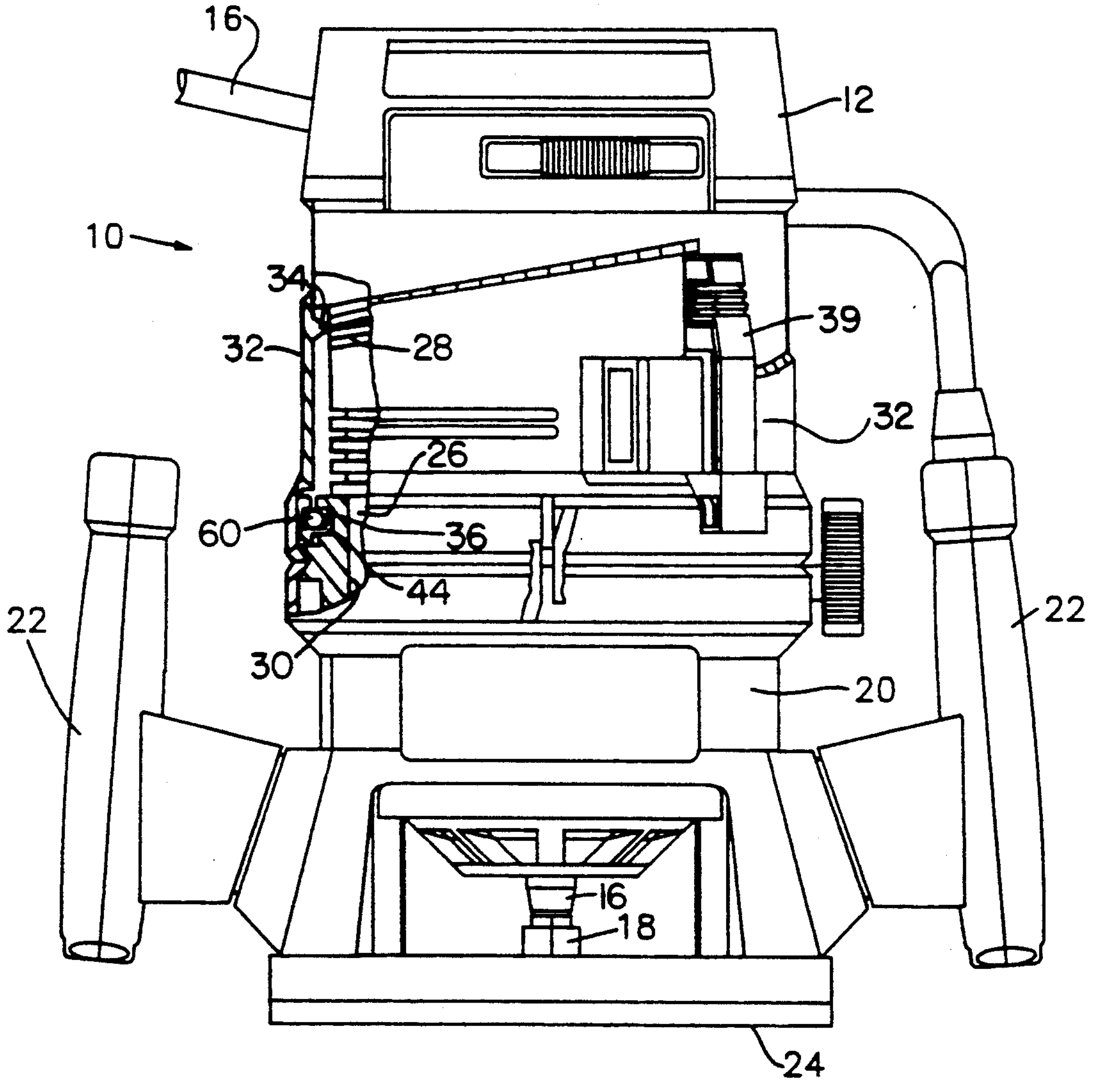
FIG. 1 is an elevational view, partially sectioned, showing a router constructed in accordance with this invention.

Referring now to the drawings, FIG. 1 illustrates a router, designated generally by the reference numeral 10, which is constructed in accordance with the principles of this invention. The router 10 includes a motor housing 12 which contains a motor (not shown) powered through a line cord 14 and a switch (not shown) and having a rotating output shaft 16 on which is mounted a collet 18 for holding a cutting tool (not shown). The motor, its mounting within the motor housing 12, and the cutting tool collet 18 form no part of the present invention and will not be described in any further detail.

The motor housing 12 is supported in a base 20 which includes a pair of handles 22 by means of which an operator can manipulate the router 10 along a work surface. The motor housing 12 is supported in the base 20 so that the cutting tool extends outwardly beyond the lower support surface 24 of the base 20. In operation of the router 10, the lower support surface 24 rests on the upper surface of the work and the distance that the cutting tool extends beyond the lower support surface 24 determines the depth of cut of the router 10. This depth of cut is adjusted by varying the longitudinal position of the motor housing 12 relative the base 20, as described in the aforereferenced U.S. patent application.

As described in the aforereferenced patent application, the motor housing 12 is generally cylindrical in external configuration. A first longitudinal region 26 of the motor housing 12 has a generally smooth surface, while a second longitudinal region is formed with an external screw thread 28. The base 20 has a cylindrical bore 30 which is sized to slidably receive therein the smooth longitudinal region 26 of the motor housing 12. In order to prevent relative rotation between the motor housing 12 and the base 20, the cylindrical bore 30 is formed with a longitudinal groove and the motor housing 12 is formed with a projection complemental thereto.

The present invention is concerned with the arrangement for setting the depth of cut of the router 10. To set the depth of cut, there is provided an adjustment ring 32 which engages the external screw thread 28 on the motor housing 12 and also rotationally engages the base 20. Since the motor housing 12 cannot partake of rotational motion relative to the base 20 because of the longitudinal groove and the projection, rotation of the adjustment ring 32 effects longitudinal displacement of the motor housing 12 relative to the base 20, which varies the distance that the cutting tool projects beyond the lower support surface 24. Subsequent clamping of the adjustment ring 32 to the motor housing 12 and the base 20 maintains the desired depth of cut setting.

Thus, the adjustment ring 32 is formed with an internal screw thread 34 which is complemental to the external screw thread 28 of the motor housing 12. The base 20 is formed with an annular groove 36 at its upper end and the adjustment ring 32 is formed with an inwardly directed projection, or flange, 38 which engages the annular groove 36. Accordingly, rotation of the adjustment ring 32 does not affect its longitudinal position with respect to the base 20 but due to the pitch of the screw thread 28 and its mating screw thread 34, the motor housing 12 is longitudinally displaced relative to the base 20. After the adjustment ring 32 is rotated by the operator to set the desired depth of cut, the ring 32 is clamped to the motor housing 12 and the base 20 by the clamping arrangement 39 to maintain the depth of cut setting.

Figure 2:
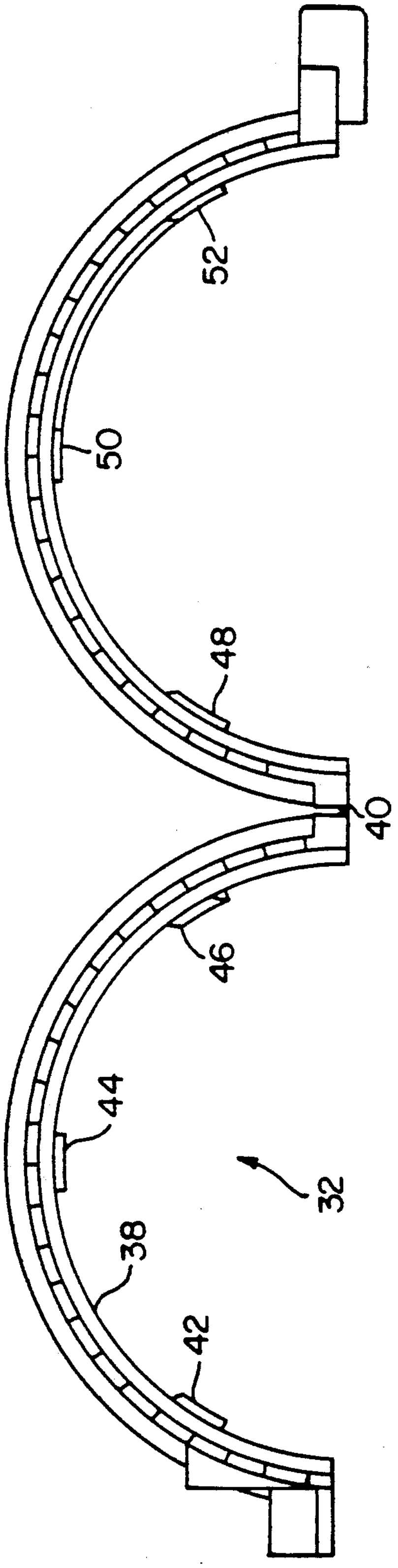
FIG. 2 is a top plan view of the adjustment ring of the router shown in FIG. 1, shown in its fully open state.
Figure 3:
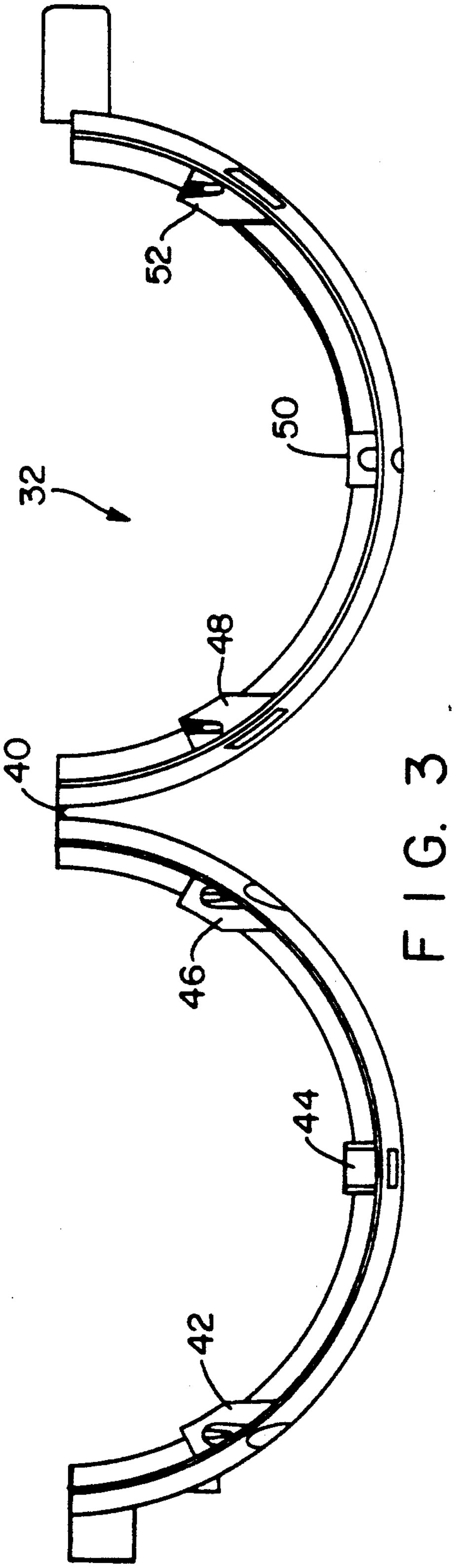
FIG. 3 is a bottom plan view of the adjustment ring of FIG. 2.
Figure 4:
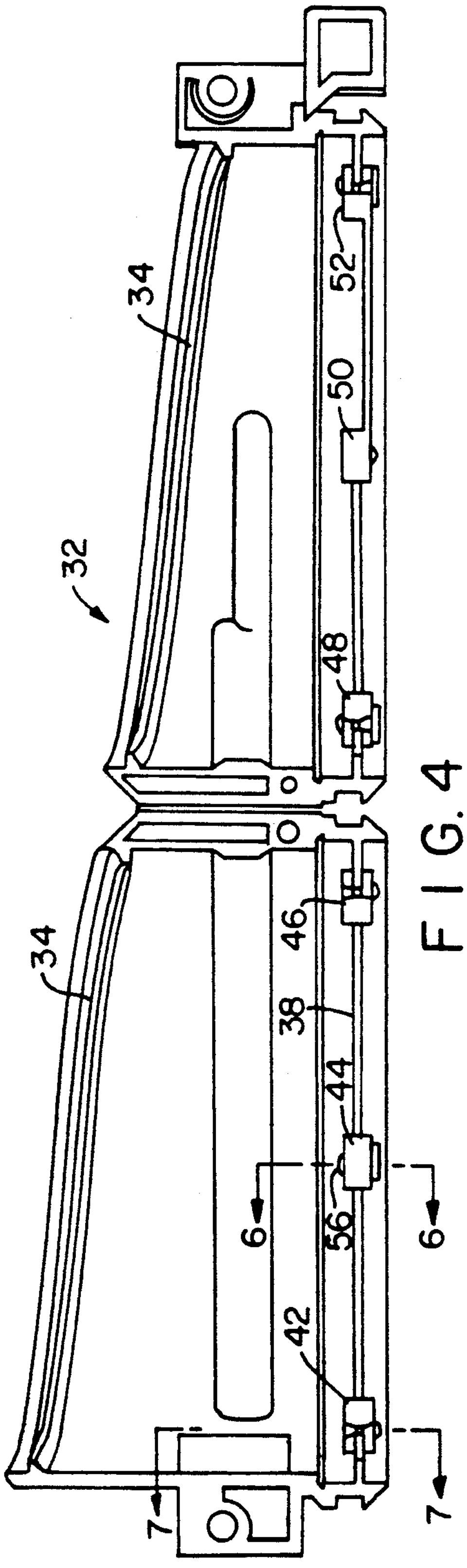
FIG. 4 is an elevational view of the interior of the open adjustment ring of FIG. 2.
Figure 5:
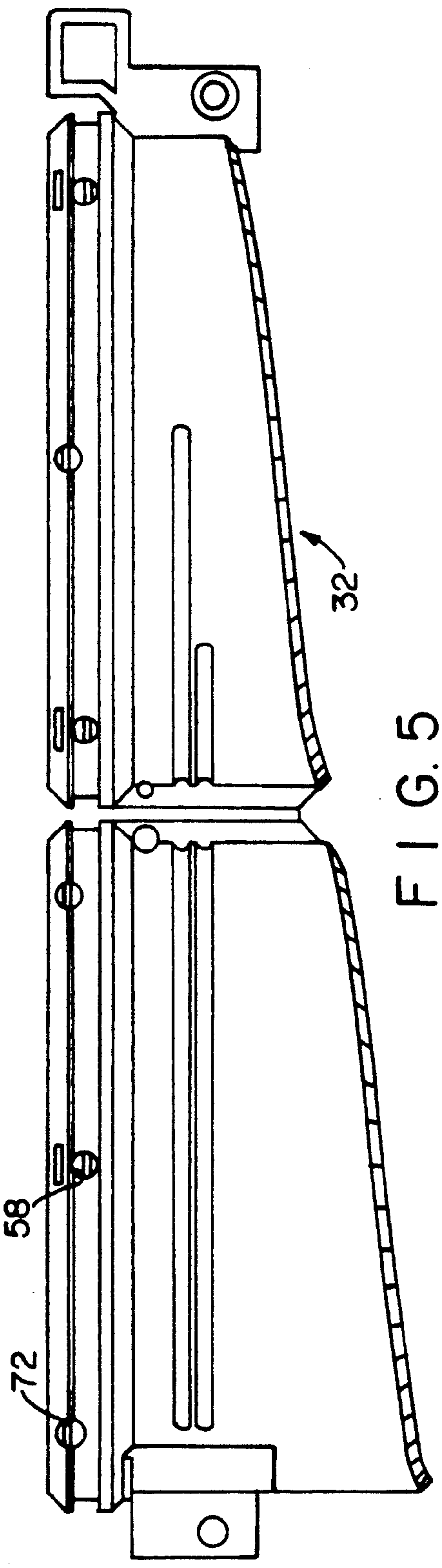
FIG. 5 is an elevational view of the exterior of the open adjustment ring of FIG. 2.
Figure 6A:
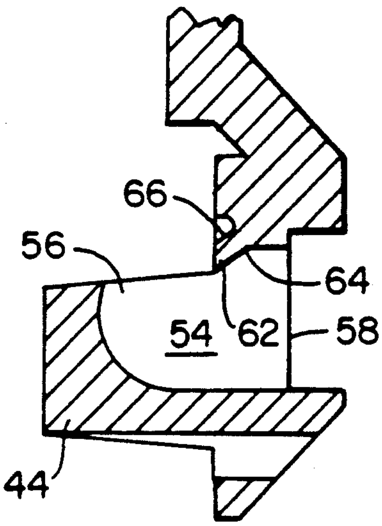
FIG. 6A is an enlarged cross sectional view taken along the line 6—6 in FIG. 4
Figure 6B:
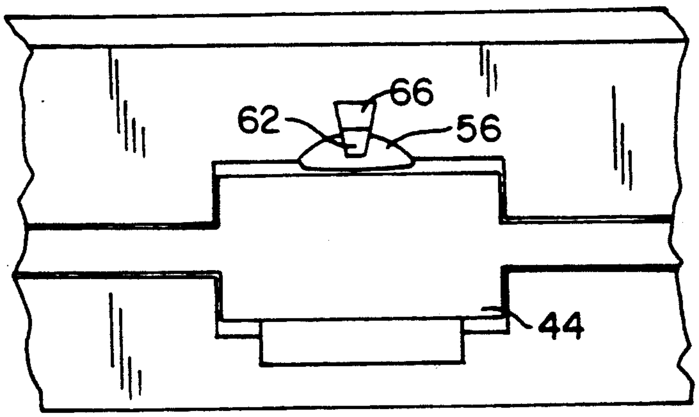
FIG. 6B is an elevational view of the left side of FIG. 6A.

Preferably, the adjustment ring 32 is a split ring hinged at 40, as best shown in FIGS. 2 and 3. Each half of the adjustment ring 3 is generally semi-circular in plan. This allows for economical molding of the adjustment ring 32 and easy assembly onto the router 10. The adjustment ring 32 is preferably of plastic material so that it is inherently resilient. When the base 20 is formed of metal, friction is developed between the projection 38 and the walls of the annular groove 36 during rotation of the adjustment ring 32 relative to the base 20. This friction detracts from the smooth movement of the adjustment ring 32 relative to the base 20 and also results in excessive wear of the projection 38 which, in the extreme, causes premature failure of the adjustment ring 32. According to this invention, the projection 38 is advantageously arranged as a ball bearing flange to eliminate the plastic-to-metal contact and allow for substantially frictionless engagement with the annular groove 36. As shown in the drawings, the projection 38 is not a smooth, uniform flange, but instead is formed with a plurality of enlarged box-like structures substantially equally spaced about the adjustment ring 32. Each of these box-like structures is adapted to hold a ball which extends outwardly through an opening in the structure to contact a wall of the annular groove 36, thereby to function as a frictionless ball bearing arrangement. Illustratively, there are six such structures 42, 44, 46, 48, 50 and 52, three of which are on each of the semi-cylindrical portions of the adjustment ring 32. As will become clear from the following discussion, the balls contained within the structures 42-52 extend outwardly in alternate axial directions so that both the upper and lower walls of the groove 36 are contacted by the balls.

Each of the structures 42-52 is formed with an internal cavity, illustratively cavity 54 for structure 44, which has a first opening 56 communicating with the groove 36, and a second opening 58 communicating with the exterior of the adjustment ring 32. Within the cavity, or pocket, 54 there is a ball 60 (FIG. 1) which extends outwardly through the first opening 56. The ball 60 and the openings 56 and 58 are sized so that the ball 60 can pass through the opening 58 but cannot pass through the opening 56. To secure the ball 60 within the pocket 54, there is provided a holder. This holder illustratively comprises a tab 62 which extends into the pocket 54 between the first opening 56 and the second opening 58. The tab 62 has a side 64 opposite the first opening 56 which slopes away from the second opening 58 so that the ball 60 can pass the tab 62 after insertion into the pocket 54 from the second opening 58. However, the configuration of the tab 62 restrains the ball 60 from movement outward from the pocket 54 back through the second opening 58. This operation is effective because the tab 62 is made of the same resilient material as the adjustment ring 32 and further because a notch 66 is formed above the tab 62 to aid in its resilience when the ball 60 is inserted into the pocket 54.

Figure 7A:
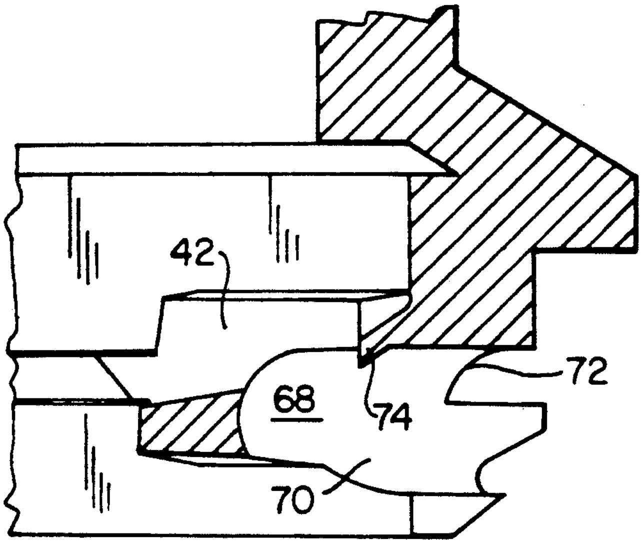
FIG. 7A is an enlarged cross sectional view taken along the line 7—7 in FIG. 4
Figure 7B:
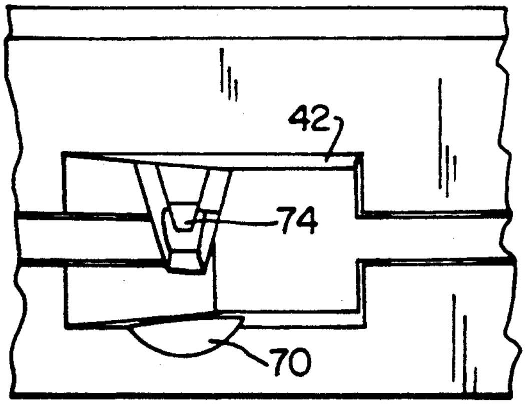
FIG. 7B is an elevational view of the left side of FIG. 7A.

The projections 44 and 50, which are in the centers of their respective semi-cylindrical portions of the adjustment ring 32, are substantially identical but axially reversed. Due to molding constraints and the necessity of pulling ring 32 from its formation mold in a straight line, the projections 42, 46, 48 and 50 must be formed somewhat differently. FIGS. 7A and 7B illustrate one of these projections, in particular, the projection 42. Thus, the projection 42 is formed with a cavity, or pocket, 68 having a first opening 70 communicating with the groove 36 and a second opening 72 communicating with the exterior of the adjustment ring 32. The resilient tab 74, while still being between the first opening 70 and the second opening 72, is on the opposite side of the pocket 68 from the first opening 70. The projections 42, 46, 48 and 52 are angled so that the major axes of their pockets are all parallel to each other when the adjustment ring 32 is in its fully open state so that the adjustment ring 32 can be pulled from its formation mold in a straight line.

Thus, after all of the balls 60 are put into their respective pockets, they alternately extend either upwardly or downwardly so that an equal number of balls contact the upper wall of the groove 36 and the lower wall of the groove 36. Thus, the adjustment ring 32 is supported in a balanced manner in the groove 36.

Accordingly, there has been disclosed an improved bearing arrangement for a router depth of cut adjustment ring. While an exemplary embodiment has been disclosed herein, it will be appreciated by those skilled in the art that various modifications and adaptations to the disclosed embodiment may be made and it is only intended that this invention be limited by the scope of the appended claims.

I claim:

1. In a router having an adjustment ring for setting the depth of cut of the router, the router having a base with an external annular groove and the adjustment ring having a projection engaging said groove so that said adjustment ring is rotatable on said base about the longitudinal axis of the router, the improvement comprising:

a plurality of cavities formed in said projection, each of said cavities having a first opening communicating with said groove and a second opening communicating with the exterior of said adjustment ring;

a plurality of balls, each of said balls being disposed within a respective one of said plurality of cavities, each of said balls being smaller than the respective second opening and larger than the respective first opening; and means situated within each of said cavities between the first and second openings for holding the respective ball within said each cavity with a portion of the respective ball extending through the first opening for contact with a wall of the groove.

2. The improvement according to claim 1 wherein there are an even number of said cavities substantially equally spaced around the adjustment ring, and the first openings of said cavities are directed alternately in a first axial direction or a second axial direction.

3. The improvement according to claim 1 wherein for each of said cavities said holding means includes a resilient tab extending into said each cavity between the first and second openings, said tab having a side opposite said first opening sloping away from said second opening so that a ball may pass said tab after insertion into said cavity from said second opening but is thereafter restrained from movement outward of said cavity.

4. The improvement according to claim 3 wherein said tab is formed with a notch on the side facing said first opening.

5. The improvement according to claim 1 wherein said adjustment ring is a unitary molded member which comprises two hingedly joined substantially semi-cylindrical portions and the major axes of said cavities for pulling the adjustment ring from its formation mold are all parallel to each other when the adjustment ring is in its fully open state.

* * * * *